United States Patent

Santhoff et al.

(10) Patent No.: US 6,996,075 B2
(45) Date of Patent: Feb. 7, 2006

(54) PRE-TESTING AND CERTIFICATION OF MULTIPLE ACCESS CODES

(75) Inventors: John H. Santhoff, Panama City Beach, FL (US); Rodolfo T. Arrieta, Panama City Beach, FL (US)

(73) Assignee: Pulse-LINK, Inc., Carlsbad, CA (US)

( * ) Notice: Subject to any disclaimer, the term of this patent is extended or adjusted under 35 U.S.C. 154(b) by 996 days.

(21) Appl. No.: 09/746,348

(22) Filed: Dec. 21, 2000
(Under 37 CFR 1.47)

(65) Prior Publication Data

US 2005/0164663 A1    Jul. 28, 2005

Related U.S. Application Data

(60) Provisional application No. 60/255,469, filed on Dec. 14, 2000.

(51) Int. Cl.
H04B 7/00      (2006.01)

(52) U.S. Cl. .............. 370/310; 370/395.1; 379/1.04

(58) Field of Classification Search .............. 370/310, 370/335, 342, 359, 395.1–395.42; 379/1.01–1.04, 379/22.03, 22.08; 375/254
See application file for complete search history.

(56) References Cited

U.S. PATENT DOCUMENTS

| | | | |
|---|---|---|---|
| 3,668,639 A | 6/1972 | Harmuth | 340/166 R |
| 3,678,204 A | 7/1972 | Harmuth | 179/15 BC |
| 4,506,267 A | 3/1985 | Harmuth | 343/744 |
| 4,641,317 A | 2/1987 | Fullerton | 375/1 |
| 4,651,152 A | 3/1987 | Harmuth | 342/13 |
| 4,743,906 A | 5/1988 | Fullerton | 342/27 |
| 4,813,057 A | 3/1989 | Fullerton | 375/37 |
| 4,979,186 A | 12/1990 | Fullerton | 375/23 |
| 5,134,408 A | 7/1992 | Harmuth | 342/21 |
| 5,148,174 A | 9/1992 | Harmuth | 342/21 |
| 5,153,595 A | 10/1992 | Harmuth | 342/22 |
| 5,159,343 A | 10/1992 | Harmuth | 342/22 |
| 5,307,081 A | 4/1994 | Harmuth | 343/842 |
| 5,363,108 A | 11/1994 | Fullerton | 342/27 |
| 5,365,240 A | 11/1994 | Harmuth | 343/701 |
| 5,493,691 A | 2/1996 | Barrett | 455/20 |
| 5,495,483 A * | 2/1996 | Grube et al. | 370/341 |
| 5,523,758 A | 6/1996 | Harmuth | 342/22 |
| 5,586,145 A | 12/1996 | Morgan et al. | 375/239 |
| 5,592,177 A | 1/1997 | Barrett | 342/361 |
| 5,610,907 A | 3/1997 | Barrett | 370/342 |
| 5,677,927 A | 10/1997 | Fullerton et al. | 375/200 |

(Continued)

OTHER PUBLICATIONS

Bruno Pattan, A Brief Exposure to Ultra-Wideband Signaling, Microwave Journal, Dec. 2003, 5 pages.

(Continued)

*Primary Examiner*—John Pezzlo
*Assistant Examiner*—Dmitry Levitan
(74) *Attorney, Agent, or Firm*—Pulse-LINK, Inc.; Peter Martinez; Steve Moore

(57) ABSTRACT

A system, method and article of manufacture are provided for managing the transmission suitability of a channel in a multi access scheme. In general, information relating to noise associated with a channel is obtained. A potential effect of the noise on a transmission quality of the channel is then estimated based on the obtained information. Next, a rating is assigned to the channel based on the estimated potential effect. Based on the assigned rating, the channel is classified into a grade of service class. Information relating to the channel and its associated rating and grade of service class is then stored in a database.

44 Claims, 10 Drawing Sheets

U.S. PATENT DOCUMENTS

| | | | |
|---|---|---|---|
| 5,687,169 A | 11/1997 | Fullerton | 370/324 |
| 5,754,353 A * | 5/1998 | Behrens et al. | 360/53 |
| 5,887,054 A * | 3/1999 | Burke et al. | 379/158 |
| 5,901,172 A | 5/1999 | Fontana et al. | 375/200 |
| 5,930,685 A * | 7/1999 | Straub | 370/477 |
| 6,031,862 A | 2/2000 | Fullerton et al. | 375/200 |
| 6,128,494 A * | 10/2000 | Rozmaryn | 455/436 |
| 6,512,746 B1 * | 1/2003 | Sand | 370/252 |
| 6,654,411 B1 * | 11/2003 | Roberts et al. | 375/225 |
| 6,694,104 B1 * | 2/2004 | Caplan et al. | 375/300 |
| 6,717,976 B1 * | 4/2004 | Shen | 370/318 |

OTHER PUBLICATIONS

David G. Leeper, Wireless Data Blaster, Scientific American, May 2002, pp. 65-69.

* cited by examiner

US 6,996,075 B2

PRE-TESTING AND CERTIFICATION OF MULTIPLE ACCESS CODES

CROSS-REFERENCE TO RELATED APPLICATION

Priority is claimed from U.S. Provisional Patent Application Ser. No. 60/255,469, filed Dec. 14, 2000, entitled "Ultra-Wideband Communication System And Method", which is referred to and incorporated herein in its entirety by reference.

FIELD OF THE INVENTION

The present invention relates generally to wireless communication systems and, more particularly, to managing multiple access schemes in ultra wideband systems to help insure high quality of service and efficient management of available channel capacity.

BACKGROUND OF THE INVENTION

In a cell-based Code Division Multiple Access (CDMA) wireless environment, there may be more total users than codes available to allow multiple access to the communication channel. This shortage of capacity may require reuse of codes every few (spatially separated) cells. The spatial separation allows the communication signals using the same codes to decay before they have a chance to interfere with each other. However, because the number of users in a cellular network is typically highly variable, the codes that are allocated to a set of users of one cell need to be allocated and de-allocated based on the number of users of that cell. There are several issues that complicate the allocation of codes as the number of users of the system increase. Firstly, the total number of available codes may be finite. Secondly, overlap of codes between adjacent cells may not be allowed.

Thirdly, the RF environment may change unpredictably along with noise propagated through that environment. Because of the nature of CDMA, data encoded with some codes may be more susceptible to noise that other data, in a particular environment noise or multipath from code re-utilization may interfere during particular times. Therefore, an optimal cellular system should not allocate codes that may induce inordinately high bit errors until the number of users absolutely requires it.

In high-density multi-user ultra wideband environments, or in environments with high noise levels, unallocated CDMA codes (which might be allocated using pulse position modulation (PPM)) may be at risk of either having been allocated already or high in noise. In either case, in a dynamic CDMA environment, the system will then check for another unassigned code, followed by another and so on as necessary until an available code has been found.

This need to seek out and find a suitable unassigned codes increases proportionately as a function of increased number of users, increased channel capacity demands, and increased noise. In high-density, multi-user, high capacity consumption and/or noisy environments the availability of acceptable unassigned codes decreases. The resultant effect can mean greater demands on the system to search for suitable unassigned CDMA codes.

If one code is already in use, or subject to too much noise, or otherwise undesirable the system will simply search for another code. While this search is extremely rapid, taking only microseconds, if this search for optimum unassigned codes is frequent, or requires multiple searches for a good code, the demands on the system will result in inefficient management of available capacity.

SUMMARY OF THE INVENTION

A system, method and article of manufacture are provided for managing the transmission suitability of a channel in a multi access scheme. In general, information relating to noise associated with a channel is obtained. A potential effect of the noise on a transmission quality of the channel is then estimated based on the obtained information. Next, a rating is assigned to the channel based on the estimated potential effect. Based on the assigned rating, the channel is classified into a grade of service class. Information relating to the channel and its associated rating and grade of service class is then stored in a database.

In an aspect of the present invention, the information relating to noise associated with the channel is obtained by sampling channel noise and then correlating the sampled channel noise with the channel. In another aspect of the present invention, the potential effect of the noise on the transmission quality of the channel based on the obtained information is estimated by determining a projected bit error rate for the channel based on the obtained information. In such an aspect, the projected bit error rate for the channel may be determined by calculating one or more interference metrics for the unallocated channel using the obtained noise information and then utilizing the calculated interference metrics to determine the projected bit error rate. As an option, one of the calculated interference metrics may be a pulse position modulation error rate. In an additional aspect of the present invention, the grade of service class relates to the channel's suitability for a particular data type.

In one embodiment of the present invention, the channel may be prioritized in its assigned grade of service class based on the rating of the channel. Additionally, this information relating to the priority of the channel is also stored in the database. In another embodiment of the present invention, the channel is obtained from the database. In a further embodiment of the present invention, the channel is periodically tested to determine whether the grade of service class of the channel needs to be changed.

In yet another embodiment of the present invention, a request for a channel may be received from a requester. The database may then be searched to obtain a channel suitable for fulfilling the request. Once obtained, the suitable channel is allocated to the requester and the requestor is notified to use the allocated channel and an indication is made in the database to indicate that the allocated channel is now in use. In even a further embodiment of the present invention, information relating to the use of a channel may be received when a user relinquishes use of the channel. From the received information, an actual bit error rate may be determined for the relinquished channel so that a rating may be assigned to the relinquished channel based on the actual bit error rate. Once the rating has been assigned, the channel may be classified into the appropriate grade of service class and the database can be updated to indicate the grade of service class of the channel that was based on the actual bit error rate and that the channel is available for use.

BRIEF DESCRIPTION OF THE DRAWINGS

The foregoing and other features, aspects and advantages are better understood from the following detailed description, appended claims, and accompanying drawings where:

DETAILED DESCRIPTION

In overview, embodiments of the present invention help improve code allocation efficiency by digitally sampling the potential impact of channel noise on the available code set by, for example, using cross-correlation between the codes and the noise. A statistical analysis of the digitized cross-correlation may then be executed to see the effect of the noise on the transmission quality by calculating a projected bit error rate. Noise parameters such as duration and amplitude may also be quantified. This information may be used to grade and assign each code into "bins" identified for optimum code usage. Bins can be created to correspond to a code's suitability for a particular data type. For example, some illustrative data types and their associated code attributes may include: (1) alphanumeric data which requires codes with the lowest number of projected bit errors; (2) video data which requires codes with the next lowest number of bit errors; (3) audio data which can use codes having the highest number of allowed errors; and (4) a set of codes that are not suitable for use because their projected bit errors are above a threshold value. In each bin, the codes can be arranged so that the best codes (i.e., the codes with the lowest bit error rates) are used first.

Ultra wideband communication systems employing techniques disclosed in embodiments of the present invention may be able to deliver higher quality of service assurance in high density, multi-user and/or noisy environments. Embodiments of the present invention may also help to increase the efficiency by which multi access scheme (e.g., code-division multiple access (CDMA)) ultra wideband systems allocate codes by proactively determining code quality before an allocation is actually made. Systems employing the techniques set forth in the present invention may also be able to more efficiently manage multi-user and/or noisy environments by effectively assessing the suitability of codes for varying ultra wideband data types and more efficient assignment/allocation of those ultra wideband multiple access scheme codes.

Figure 1:
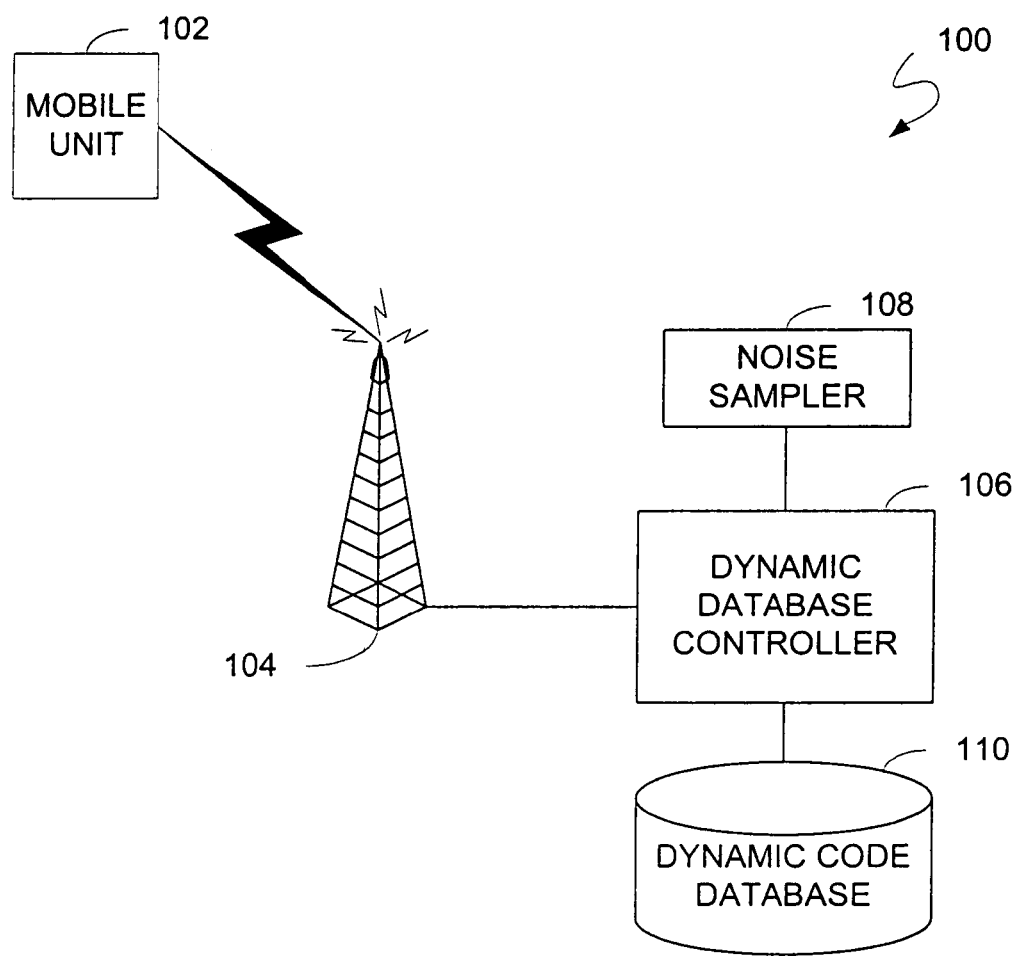
FIG. 1 is a schematic diagram of an exemplary ultra wideband communication system capable of utilizing a multiple access scheme in accordance with an embodiment of the present invention.

FIG. 1 is a schematic diagram of an exemplary ultra wideband communication system 100 capable of utilizing a multiple access scheme in accordance with an embodiment of the present invention. One or more wireless mobile units 102 capable of ultra wideband communication communicate with an ultra wideband base station 104. A dynamic database controller 106 is coupled to the base station. The dynamic database controller 106 includes a processor for executing its functions and is coupled to a noise sampler 108 and a database 110.

Figure 2:
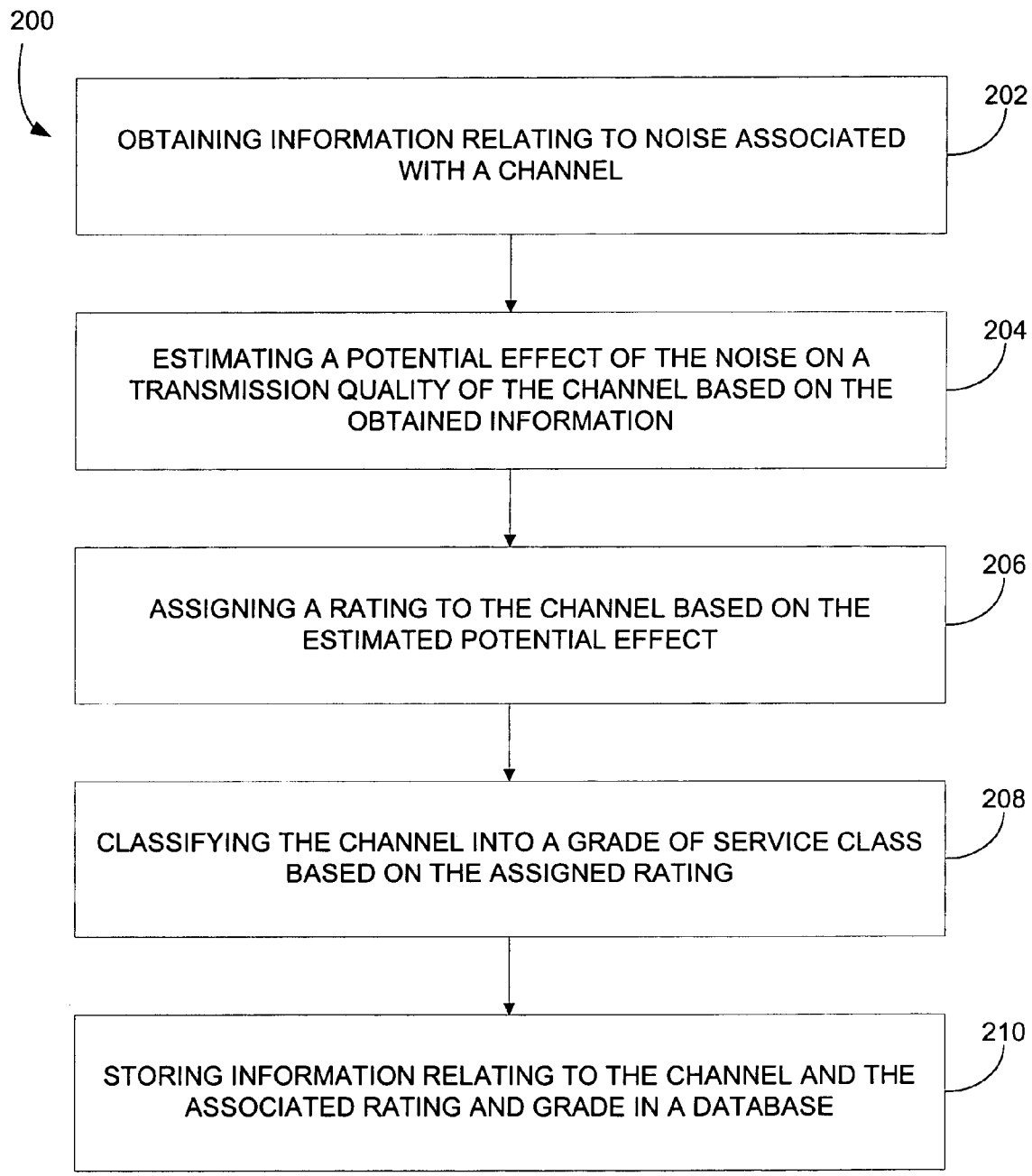
FIG. 2 is a flowchart of a process for managing the transmission suitability of a multiple access channel in a multi access scheme utilizing a dynamic database controller in a communication system such as an ultra wideband communication system in accordance with an embodiment of the present invention.

FIG. 2 is a flowchart of a process 200 for managing the transmission suitability of a multiple access channel in a multi access scheme utilizing a dynamic database controller 106 in a communication system such as an ultra wideband communication system in accordance with an embodiment of the present invention. In general, information relating to channel noise ("channel noise information") associated with an unallocated channel is obtained utilizing the noise sampler 108 in operation 202 (It should be understood that the term "channel" used in the present invention may broadly refer to a multiple access scheme channel where multiple access may be achieved by codes, frequency, polarization, phase, etc.). The dynamic database controller 106 then estimates a potential effect of the channel noise on a transmission quality of the unallocated channel based on the obtained information in operation 204. Next in operation 206, a rating is assigned by dynamic database controller 106 the to the unallocated channel based on the estimated potential effect. Based on the assigned rating, the channel is classified into a grade of service class or classification in operation 208. Information relating to the now classified channel and its associated rating and grade of service class is then stored in the database 110 in operation 210.

In closer detail, ultra wideband wireless transmissions depend on multiple data streams (typically audio, video, and/or data) going to multiple users. Since ultra wideband transmissions are of a serial nature, they must integrate these data streams into assigned serial time slots. On occasion these assigned time slots have either natural or manmade interference that causes the ultra wideband multiple access link or code (often referred to herein as a "channel") carrying a particular data stream to be unreliable. As a result, efforts must be made to maintain Quality of Service (QoS) for these data streams. Embodiments of the present invention provided a process by which each channel may be tested and certified before allocation. Oftentimes, these channels are implemented by specifying different codes (sequences) for each multiple access link. There are several well-known means by which multiple codes allow multiple links to be created. The choice of a particular multiple access scheme does not impact the functionality of embodiments of the present invention. After allocation, bit error rates may be monitored for each channel to insure channel quality and integrity. Finally, a pool of channels may be tested and certified in advance to satisfy any user requests for additional reliable ultra wideband channels in a timely manner.

There are several issues that may complicate the allocation of codes as the number of users of the system increase including: (1) the total number of available codes may be finite and dynamic code reallocation may be become necessary; (2) overlap of codes may not be allowed in a cell or between adjacent cells; and (3) the RF environment may change unpredictably and, therefore, so may the noise propagated through that environment.

Figure 3:
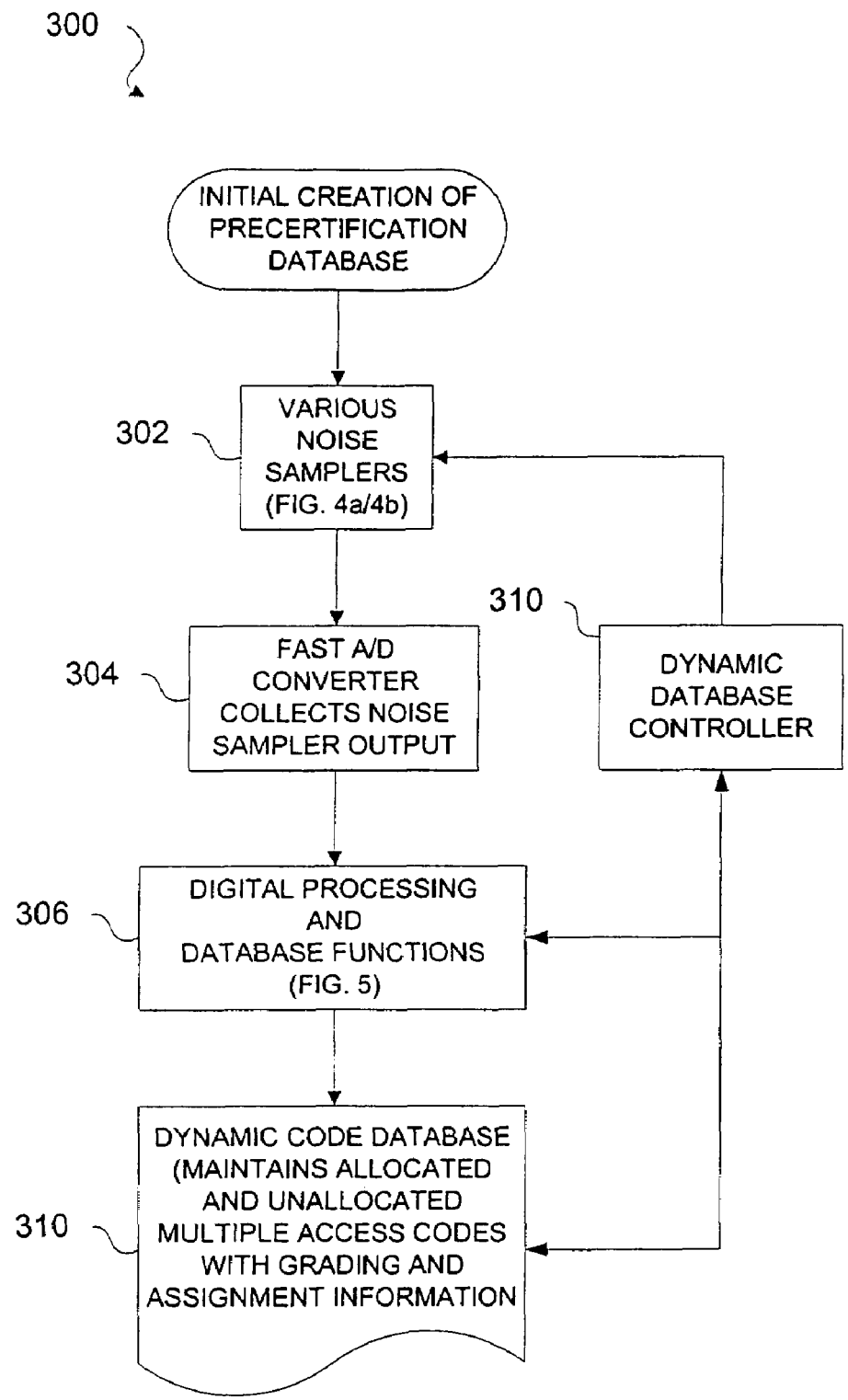
FIG. 3 is a schematic block diagram illustrating a process for creating a dynamic code database for keeping track of code usage and quality in order to maintain the highest Quality of Service (QoS) possible in accordance with an embodiment of the present invention.

FIG. 3 is a schematic block diagram illustrating a process 300 for creating a dynamic code database for keeping track of code usage and quality in order to maintain the highest QoS possible in accordance with an embodiment of the present invention. The database 110 is initialized by first applying all the codes (preferably in sequence) to a noise sampler 108 that may use the output of a RF sensor (which may be the same as the receive antenna) as the noise input (see operation 302). The output of the noise sampler may then be digitized by a fast Analog to Digital (A/D) converter (see operation 304) or, as another option, the output may integrated, latched and digitized by a slower A/D converter. The digitized data may then be used by the dynamic database controller 106 to determine metrics to be used in calculating a Projected Bit Error Rate (PBER) for a particular code (see operation 306). Subsequently, the PBER may be used to organize the codes in the database 110 such that the codes with the lowest PBER are available first.

Figure 4A:
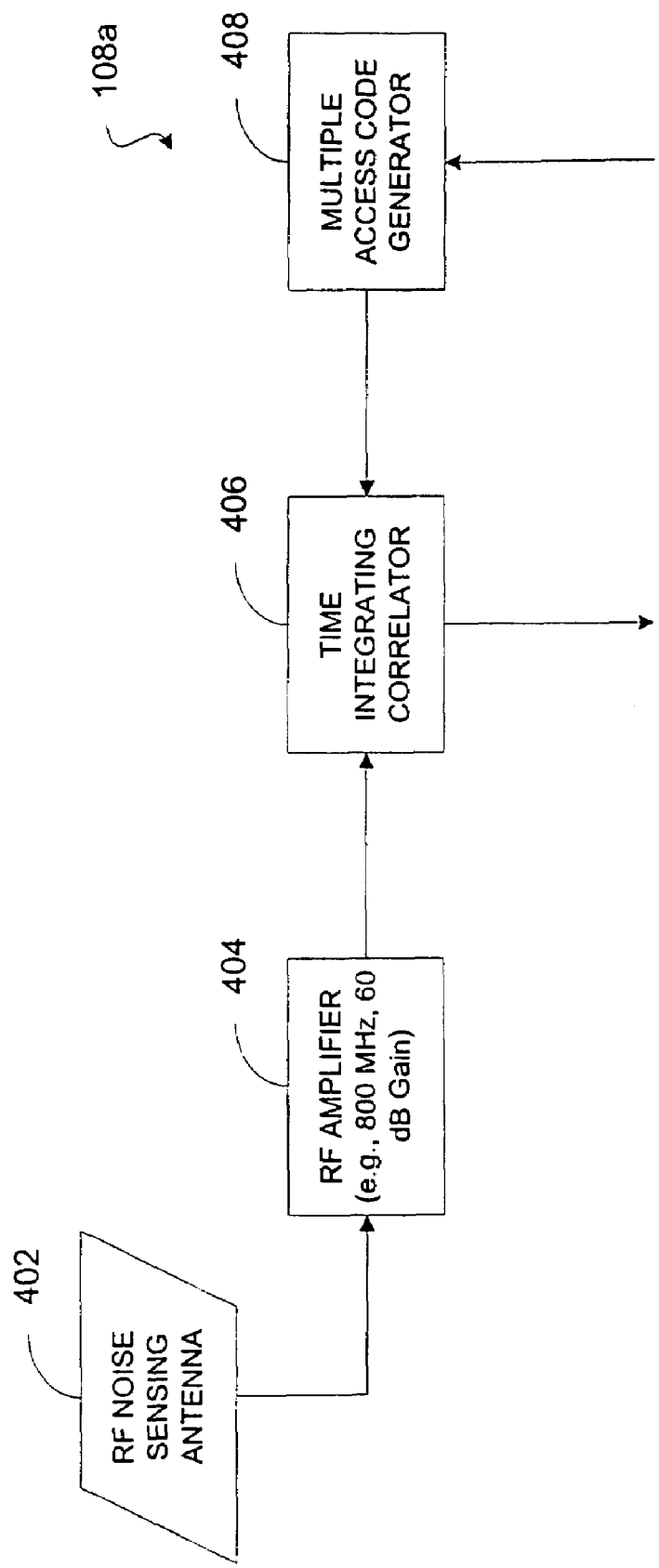
FIG. 4a is a schematic diagram of one embodiment of the noise sampler based on using a time integrating correlator to correlate the RF noise signal with the code sequence in accordance with an embodiment of the present invention.

In an aspect of the present invention, the information relating to noise associated with the channel may be obtained by sampling channel noise and then correlating the sampled channel noise with the channel. FIG. 4a is a schematic diagram of one embodiment of the noise sampler 108a based on using a time integrating correlator to correlate the RF noise signal with the code sequence in accordance with an embodiment of the present invention. In particular, an RF noise sensing antenna 402 is coupled to a RF amplifier 404 which is coupled to a time integrating generator 406. The time integrating generator is also coupled to a multiple access code generator 408. This embodiment may be suitable for Code Division Multiple Access schemes. Time integrating correlators and code generators for these codes are well known in the art. The RF noise samples for this approach may be detected either with the antenna used for data reception or by a dedicated noise-sensing antenna.

Figure 4B:
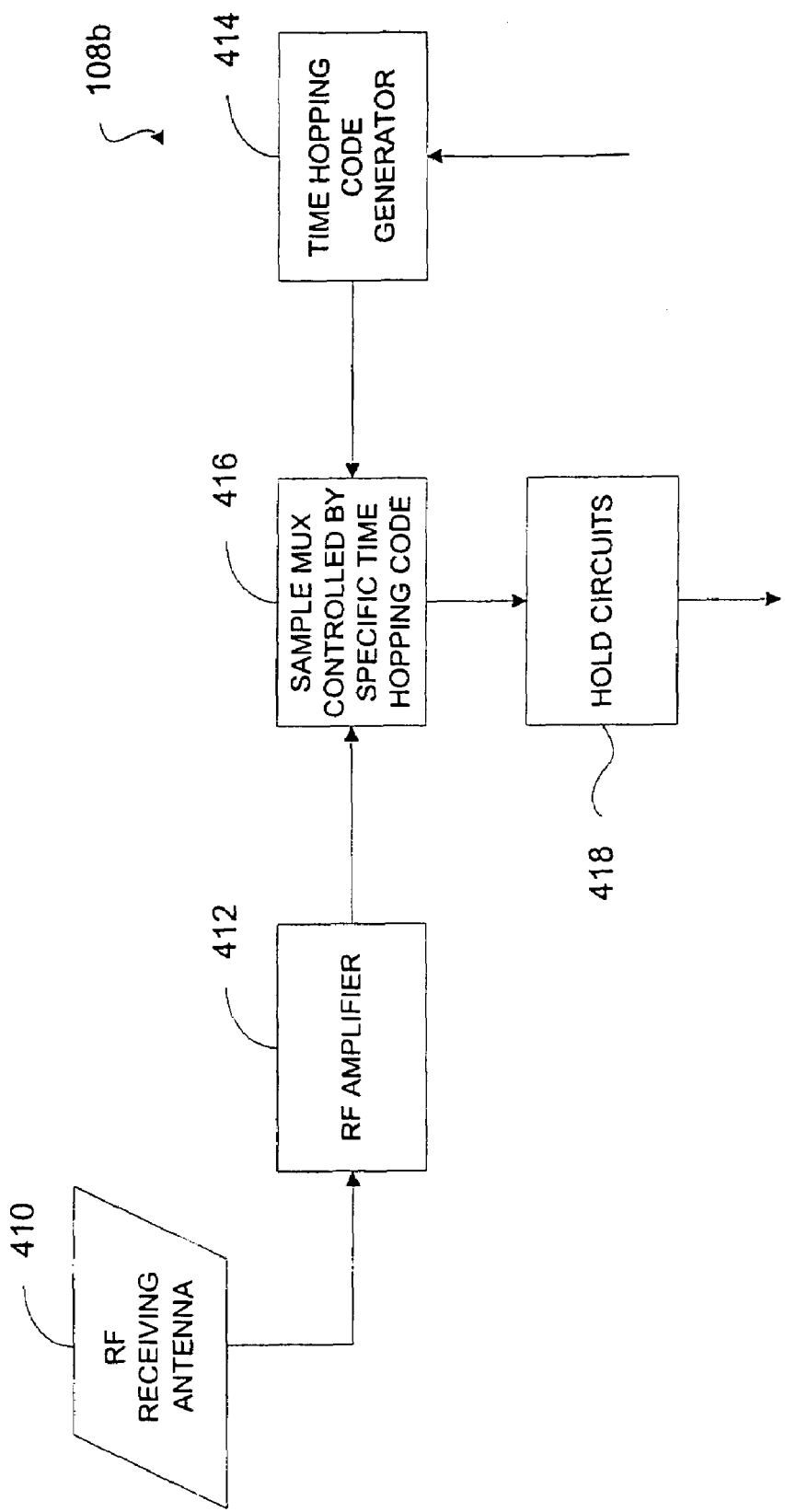
FIG. 4b is a schematic diagram of a noise sampler that utilizes real-time sampling of time windows in accordance with a preferred embodiment of the present invention.

FIG. 4b is a schematic diagram of a noise sampler 108b that utilizes real-time sampling of time windows in accordance with a preferred embodiment of the present invention. This noise sampler 108b is based on a different access scheme than the access scheme utilized in FIG. 4a. In particular, a RF receiving antenna 410 is coupled to a RF amplifier 412. The RF amplifier 412 and a Time Hopping code generator 414 are both coupled to a multiplexer (MUX) 416 which, in turn is coupled to Hold logic 418. In this noise sampler 108b, a pseudorandom Time Hopping sequence is used together with a Time Division Multiple Access scheme (TH-TDMA). The data-receiving antenna 410 is used to sense the noise present in the time slots to be occupied by a particular unallocated Time Hopping sequence. In order to do this, the Time Hopping sequence is used to control the MUX 416 that allows the input samples to be held and digitized at the appropriate times matching the times that would be allocated to the Time Hopping sequence being tested.

Figure 5:
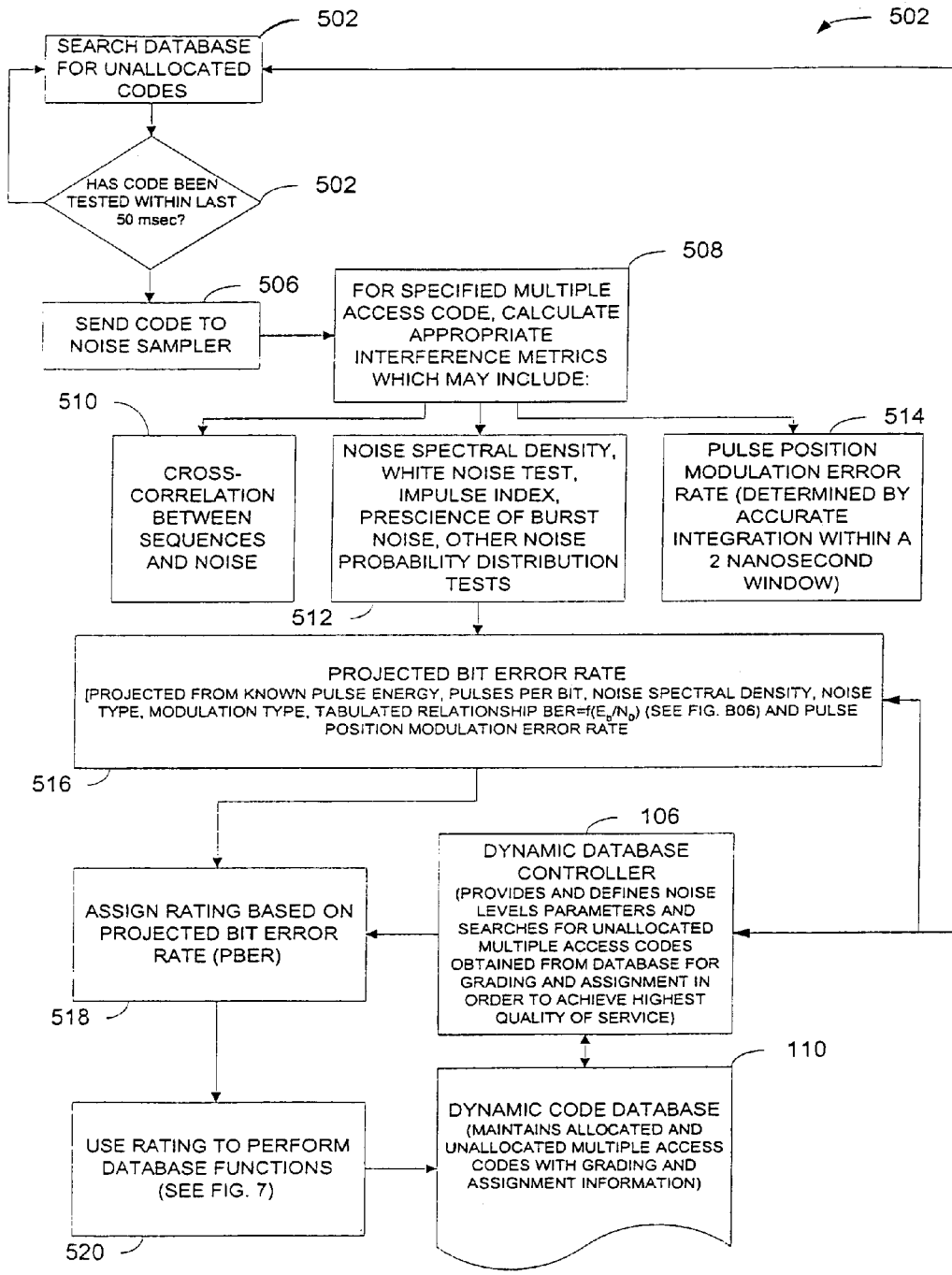
FIG. 5 is a flowchart of a process for performing digital signal processing and database functions to accomplish quality grading of unallocated codes in accordance with an embodiment of the present invention.

FIG. 5 is a flowchart of a process 500 for performing digital signal processing and database functions to accomplish quality grading of unallocated codes in accordance with an embodiment of the present invention. In one aspect of the present invention, the potential effect of the channel noise on the transmission quality of the unallocated channel based on the obtained information may be estimated by determining a PBER for the channel based on the obtained information. In such an aspect, the PBER for the unallocated channel may be determined by calculating one or more interference metrics for the unallocated channel using the obtained noise information and then utilizing the calculated interference metrics to determine the PBER. As an option, one of the calculated interference metrics may be a pulse position modulation error rate.

With continued reference to FIG. 5, the dynamic database controller 106 constantly monitors the codes in the database to determine that their grading is up-to-date (see operations 502, 504, and 506). As depicted in FIG. 5, the decision rule in operation 504 may be based on re-testing any codes that have not been tested for a specified period of time. In a preferred embodiment of the present invention, this time may be at least 10 msec and at most 1 second. In a more preferred embodiment, this time may be 50 to 100 msec. The re-testing is performed and managed by the database controller 106. The database controller 106 sends the code to be tested to the noise sampler 108 and calculates the appropriate metrics that may include, for example: cross correlation between sequences and noise (see operation 510), noise spectral density, white noise test, impulse index, presence of burst noise, and other noise probability distribution tests (see operation 512), as well as other heuristic tests.

The tests may also include tests that determine noise introduced into the modulation method. In a preferred embodiment, the modulation method may pulse position modulation so that a pulse position modulation error rate may be calculated (see operation 514). In one implementation of the pulse position modulation method, a pulse may be placed in one of two contiguous time bins to represent a zero (0)or a one (1). For example, if the pulse is placed in a first bin, the pulse may be represented as a one, whereas if the pulse is placed in a second bin, the pulse may be represented as a zero. One way to characterize this type of noise is to integrate the signal present in both time bins and compare the integral to a threshold equivalent to the integral of one pulse. If the integral does not match the one pulse equivalent (i.e., the pulse represented in the first bin), a pulse position error is deemed to have occurred.

As shown in operation 516, the result of these tests and metrics are then used to calculate a projected (or potential) bit error rate (PBER) either, for example, through a direct calculation or through a lookup table and interpolation—if necessary. Several additional parameters may be necessary in order to calculate this metric. These parameters may include: the pulse energy, pulses per bit (if a CDMA scheme is being used), noise spectral density, noise type, and modulation type.

Once the PBER has been computed, a rating is assigned to the code in operation 518 and the code is then allocated to a data type in operation 520. The code and the information relating to its rating and data type allocation are then stored in the database 110.

Figure 6:
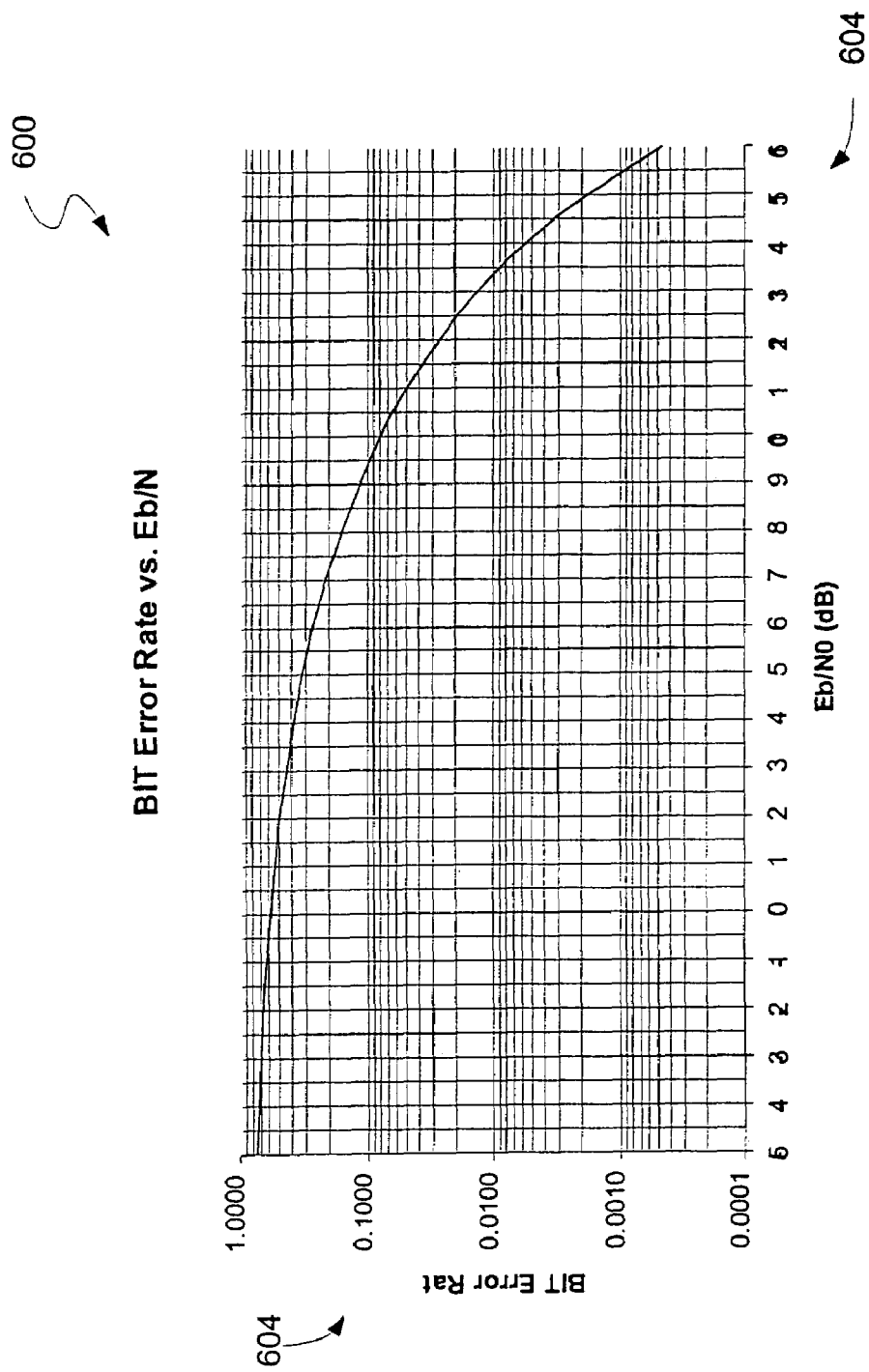
FIG. 6 depicts a graph showing a type of functional relationship often found between the BER and the ratio of the pulse energy ($E_b$) to noise spectral density ($N_0$) in accordance with an embodiment of the present invention.

FIG. 6 depicts a graph 600 showing a type of functional relationship often found between the BER 602 and the ratio of the pulse energy ($E_b$) to noise spectral density ($N_0$) 604 in accordance with an embodiment of the present invention. Such relationships depend on the type of modulation and other factors and are best derived empirically. If the data is empirical, it can be maintained in a lookup table and values interpolated using standard techniques as set forth in operation 516.

In one aspect of the present invention, the grade of service class relates to the channel's suitability for a particular data type. In such an aspect, the grade of service classes may include a class for a grade of service suitable for alphanumeric data, a class for a grade of service suitable for suitable for video data, a class for a grade of service suitable for suitable for audio data, and a class for a grade of service not suitable for data. In one embodiment of the present invention, the channel may be prioritized or ranked for allocation in its assigned grade of service class based on the rating of the channel. Additionally, this information relating to the priority of the classified channel may also be stored in the database.

Figure 7:
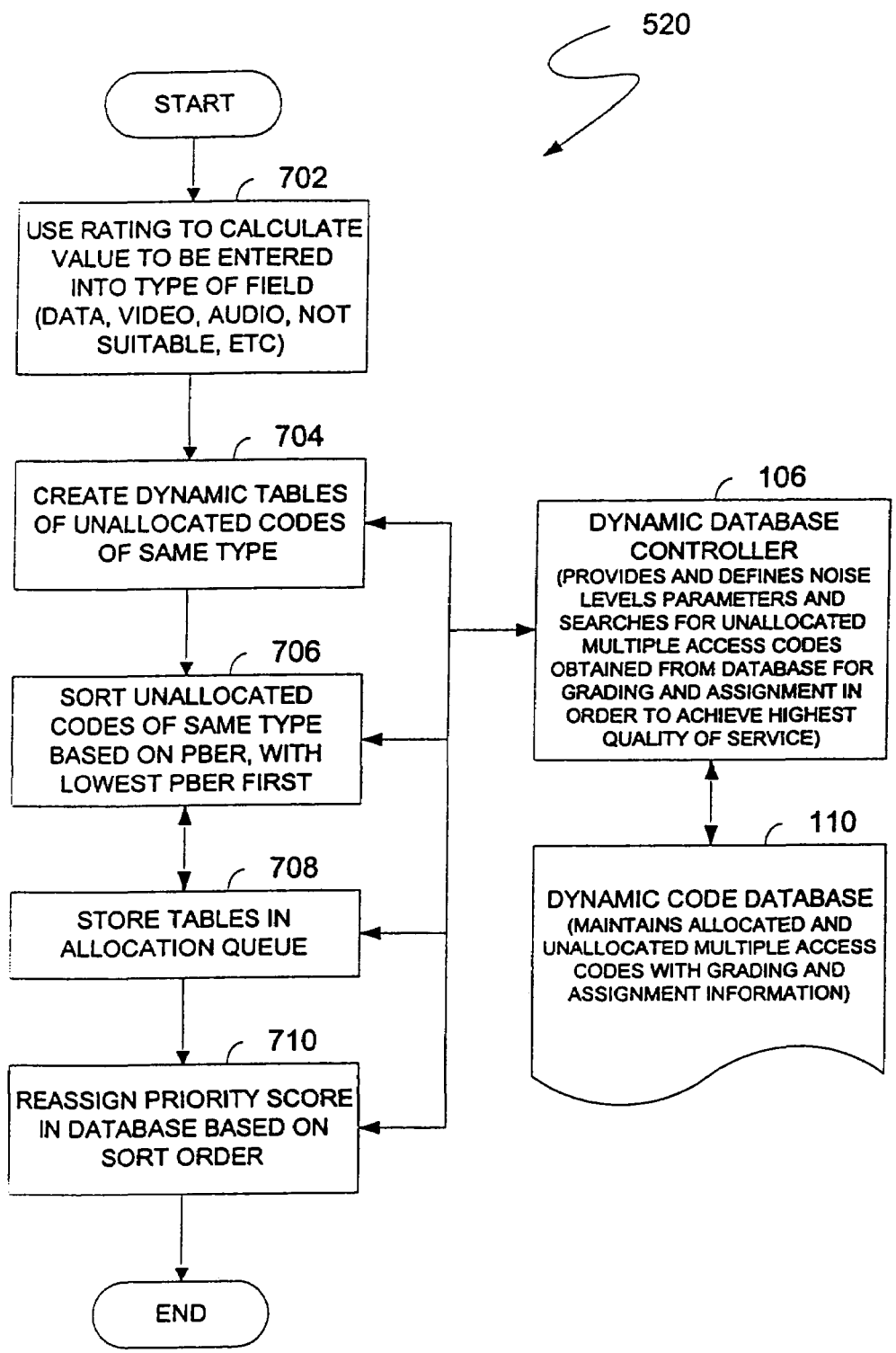
FIG. 7 is a flowchart for a process for performing the digital signal processing functions by the database controller in order to maximize the quality of service in accordance with an embodiment of the present invention.

FIG. 7 is a flowchart for a process for performing the digital signal processing functions of operation 520 by the database controller 106 in order to maximize the quality of service in accordance with an embodiment of the present invention. In operation 702, the database controller uses the assigned rating obtained in operation 518 of FIG. 5 to determine the value to place in the data type field of the database. The value may be based on categories of data quality such as, for example: "good enough for digital documents," "good enough for video," "good enough for audio," and "too noisy for any type of data."

The database controller 110 then creates dynamic tables of unallocated codes of the same type in order to manipulate them in dynamic fashion in operation 704. In operation 706, the tables are sorted by the original rating of the codes in order to place the best codes first in the allocation queue in operation 708. The database controller 106 then updates the database 110 based on the dynamic tables in operation 710 so that the multiple access codes, code assignments and code priority are stored in the dynamic code database 110. With this process, the reassigning of code priority allows achievement of the highest quality of service possible.

The following illustrative example is provided to further clarify and aid comprehension of the processes set forth in FIGS. 5 and 7. Suppose there are four categories of data quality for channels including: a first category for digital document quality, a second category for video quality, a third category for audio quality and a fourth category for not good for any data. Each category may have a range of ratings (based on the PBER—see FIG. 5) associated with it. For example, if the ratings assigned to the channel in operation 518 are between 10 and 1 with 10 being the best rating and 1 being the worst ratings, the ratings may be divided amongst the categories so that (merely as an illustrative example) the first category is associated with the range of ratings between 10 and 9, the second category is associated with the range of ratings between 8 and 7, the third category is associated with the range of ratings between 6 and 5, and the fourth category is associated with the range of ratings between 4 and 1.

Thus, following the processes set forth in FIGS. 5 and 7 (see operations 520, 702, and 704), if a channel is assigned:
  (i) a rating between 10 and 9, then the channel is classified into to the first category,
  (ii) a rating between 8 and 7, then the channel is classified into the second category,
  (iii) a rating between 6 and 5, then the channel is classified into the third category, and
  (iv) a rating between 4 and 1, the channel is classified into the fourth category.

Next, the channels are sorted in their assigned category so that the channels are ordered best-rated-channels-first in their respective category so that the best rated channels in each category have a higher priority than then worst rated channels in the same category. For example, in the first category, those channels having a rating closer to 10 are ordered higher in priority than those channels having a rating closer to 9. As an illustration, suppose there are four channels classified into the first category with the following ratings: channel 1—9.6, channel 2—9.2, channel 3—9.4 and channel 4—9.8. Then, these channels would be sorted and ordered by priority in the first category (from highest priority to lowest priority) as: channel 4, channel 1, channel 3, and (lastly with the lowest priority) channel 2.

Figure 8:
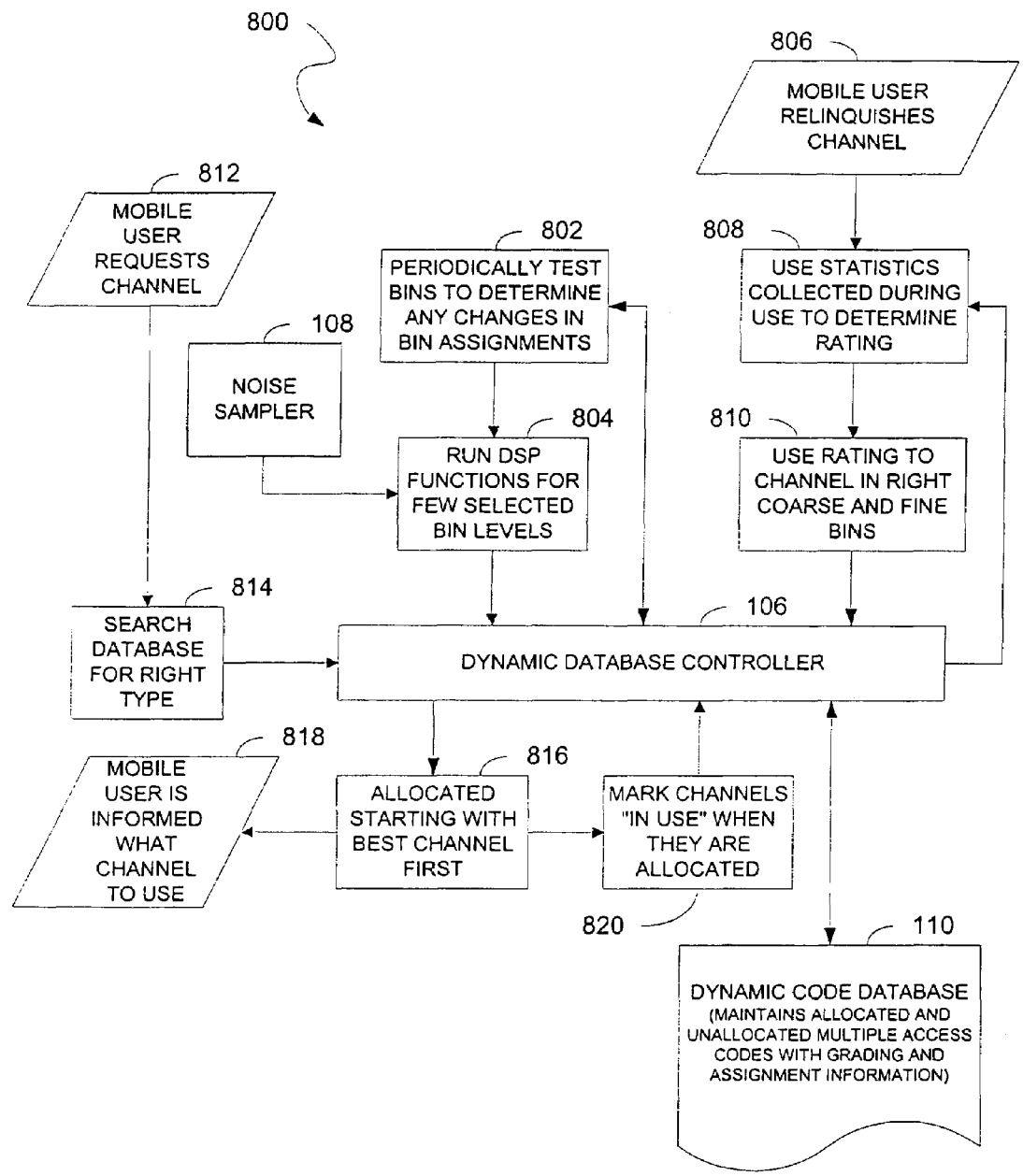
FIG. 8 is a schematic diagram illustrating a process for maintaining a dynamic channel database in an ultra wideband communication framework in accordance with an embodiment of the present invention.

FIG. 8 is a schematic diagram illustrating a process 800 for maintaining a dynamic channel database in an ultra wideband communication framework in accordance with an embodiment of the present invention. In an embodiment of the present invention, the unallocated channel may be obtained from the database. In particular, in one such aspect of such an embodiment, the database controller 106 may periodically test codes using the noise sampler 108 and the digital signal processing functions (as discussed in the previous figures) to determine whether the grade of service class of the channel needs to be changed (see operations 802 and 804). If it is determined that the grade of service class/classification of the channel does in fact need to be changed, then the grade of service class of the channel is changed to the appropriate grade of service class.

With continuing reference to FIG. 8, the database controller 106 may also collect actual bit error rate statistics on codes that are in use in order place them in the right categories once they are de-allocated. In such an embodiment, information relating to the use of a channel may be received when a user relinquishes use of the channel (see operation 806). From the received information, an actual bit error rate may be determined for the relinquished channel so that a rating may be assigned to the relinquished channel based on the actual bit error rate (rather than the potential bit error rate) in operation 808. Once the rating has been assigned, the channel may be classified into the appropriate grade of service class (see operation 810) and the database can be updated to indicate the grade of service class of the channel that was based on the actual bit error rate and that the channel is available for use.

In another aspect of the present invention, when a mobile user requests a channel, the database controller may search the database for the right type and allocates the best available channel first (another option is to allocate a channel based on the quality requirements of the particular user). Once a channel is allocated it is marked "in use" in the database. In particular, with reference to FIG. 8, a request for a channel may be received from a requestor in operation 812. The database may then be searched in operation 814 to obtain a channel suitable for fulfilling the request. Once obtained, the suitable channel is allocated to the requestor in operation 816 and the requestor is notified to use the allocated channel in operation 818. Additionally, an indication is made in the database 110 to indicate that the allocated channel is now in use (see operation 820).

For example, using the illustrative scenario set forth previously when discussing FIGS. 5 and 7, suppose the requestor requires a channel suitable for transmitting digital documents. Then, the database would be searched to determine which channels have being classified into the first category (which is associated with channel suitable for transmitting digital documents). The database controller would then determine whether channel 4 (having a rating of 9.8 and therefore the best suited channel in the first category) was available to be assigned to the requestor. If channel 4 is available, then the requestor would be notified to use channel 4 and an indication would be made in the database to indicator that channel 4 is now in use. If, on the other hand, channel 4 is found to be not available (e.g., already in use), then the database controller would search the database for the next best suited channel in the first category—channel 1 (having a rating of 9.6) and determine whether channel 1 was available and so on.

Figure 9:
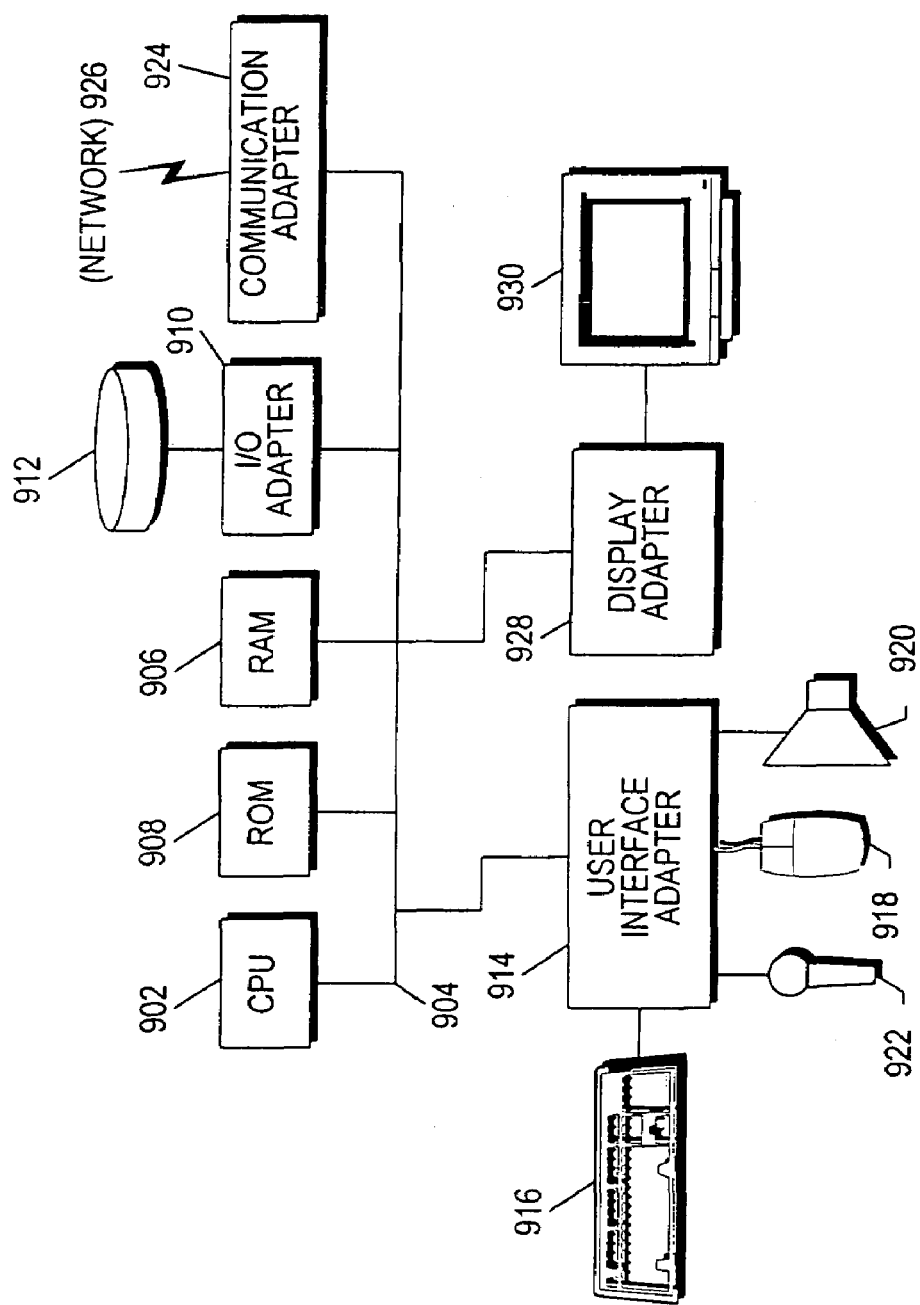
FIG. 9 is a schematic diagram of a representative hardware environment in accordance with an embodiment of the present invention.

FIG. 9 illustrates a representative hardware environment 900 by which embodiments of the present invention may be carried out is depicted in FIG. 9. In the present description, the various sub-components of each of the components may also be considered components of the system. For example, particular software modules executed on any component of the system may also be considered components of the system. The hardware configuration 900 illustrated in FIG. 9 includes a central processing unit 902, such as a microprocessor, and a number of other units interconnected via a system bus 904.

The workstation 900 shown in FIG. 9 includes a Random Access Memory (RAM) 906, Read Only Memory (ROM) 908, an I/O adapter 910 for connecting peripheral devices such as disk storage units 912 to the bus 904, a user interface adapter 914 for connecting a keyboard 916, a mouse 918, a speaker 920, a microphone 922, and/or other user interface devices such as a touch screen (not shown) to the bus 904, communication adapter 924 for connecting the workstation to a communication network 926 (e.g., a data processing network) and a display adapter 928 for connecting the bus 904 to a display device 930.

An embodiment of the present invention may be written using JAVA, C, and the C++ language and utilize object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved.

Wireless refers to a communications, monitoring, or control system in which electromagnetic radiation spectrum or acoustic waves carry a signal through atmospheric space rather than along a wire. In most wireless systems, radio frequency (RF) or infrared transmission (IR) waves are used. Some monitoring devices, such as intrusion alarms, employ acoustic waves at frequencies above the range of human hearing.

Early experimenters in electromagnetic physics dreamed of building a so-called wireless telegraph. The first wireless telegraph transmitters went on the air in the early years of the 20th century. Later, as amplitude modulation (AM) made it possible to transmit voices and music via wireless, the medium came to be called radio. With the advent of television, fax, data communication, and the effective use of a larger portion of the electromagnetic spectrum, the original term has been brought to life again.

Common examples of wireless equipment in use today include the Global Positioning System, cellular telephone phones and pagers, cordless computer accessories (for example, the cordless mouse), home-entertainment-system control boxes, remote garage-door openers, two-way radios, and baby monitors. An increasing number of companies and organizations are using wireless LAN. Wireless transceivers are available for connection to portable and notebook computers, allowing Internet access in selected cities without the need to locate a telephone jack. Eventually, it will be possible to link any computer to the Internet via satellite, no matter where in the world the computer might be located.

A bit error rate (BER) in telecommunication transmission is the percentage of bits that have errors relative to the total number of bits received in a transmission, usually expressed as ten to a negative power. For example, a transmission might have a BER of 10 to the minus 6, meaning that, out of 1,000,000 bits transmitted, one bit was in error. The BER is an indication of how often a packet or other data unit has to be retransmitted because of an error. Too high a BER may indicate that a slower data rate would actually improve overall transmission time for a given amount of transmitted data since the BER might be reduced, lowering the number of packets that had to be resent.

Signal-to-noise ratio (S/N or SNR) is a measure of signal strength relative to background noise. The ratio is usually measured in decibels (dB). If the incoming signal strength in microvolts is $V_s$, and the noise level, also in microvolts, is $V_n$, then the signal-to-noise ratio, S/N, in decibels is given by the formula:

$$S/N = 20\ \log_{10}(V_s/V_n)$$

If $V_s = V_n$, then S/N=0. In this situation, the signal borders on unreadable, because the noise level severely competes with it. In digital communications, this may cause a reduction in data speed because of frequent errors that require the source (transmitting) computer or terminal to resend some packets of data. Ideally, Vs is greater than $V_s$, so S/N is positive. As an example, suppose that $V_s = 10.0$ microvolts and $V_n = 1.00$ microvolt. Then:

$$S/N = 20\ \log_{10}(10.0) = 20.0\ \text{dB}$$

which results in the signal being clearly readable. If the signal is much weaker but still above the noise—say, for example, 1.30 microvolts—then:

$$S/N = 20\ \log_{10}(1.30) = 2.28\ \text{dB}$$

which is a marginal situation. There may be some reduction in data speed under these conditions.

If $V_s$ is less than $V_n$, then S/N is negative. In this type of situation, reliable communication may generally not be possible unless steps are taken to increase the signal level and/or decrease the noise level at the destination (receiving) computer or terminal.

Conventional spread spectrum is a form of wireless communications in which the frequency of the transmitted signal is deliberately varied. This results in a much greater bandwidth than the signal would have if its frequency were not varied. A conventional wireless signal has a frequency, usually specified in megahertz (MHz) or gigahertz, that does not change with time (except for small, rapid fluctuations that occur as a result of modulation). When you listen to a signal at 103.1 MHz on an FM stereo receiver, for example, the signal stays at 103.1 MHz. It does not go up to 105.1 MHz or down to 99.1 MHz. The digits on the radio's frequency dial stay the same at all times. The frequency of a conventional wireless signal is kept as constant as the state of the art will permit, so the bandwidth can be kept within certain limits, and so the signal can be easily located by someone who wants to retrieve the information.

There are at least two problems with conventional wireless communications that can occur under certain circumstances. First, a signal whose frequency is constant is subject to catastrophic interference. This occurs when another signal is transmitted on, or very near, the frequency of the desired signal. Catastrophic interference can be accidental (as in amateur-radio communications) or it can be deliberate (as in wartime). Second, a constant-frequency signal is easy to intercept, and is therefore not well suited to applications in which information must be kept confidential between the source (transmitting party) and destination (receiving party).

To minimize troubles that can arise from the above mentioned vulnerabilities of conventional communications circuits, the frequency of the transmitted signal can be deliberately varied over a comparatively large segment of the electromagnetic radiation spectrum. This variation is done according to a specific, but complicated mathematical function. In order to intercept the signal, a receiver must be tuned to frequencies that vary precisely according to this function. The receiver must "know" the frequency-versus-time function employed by the transmitter, and must also "know" the starting-time point at which the function begins. If someone wants to jam a spread-spectrum signal, that person must have a transmitter that "knows" the function and its starting-time point. The spread-spectrum function must be kept out of the hands of unauthorized people or entities.

Previous spread-spectrum schemes use a digital scheme called frequency hopping. The transmitter frequency changes abruptly, many times each second. Between "hops," the transmitter frequency is stable. The length of time that the transmitter remains on a given frequency between "hops" is known as the dwell time. A few spread-spectrum circuits employ continuous frequency variation, which is an analog scheme.

Ultra wideband radio (also known as digital pulse wireless) is a wireless technology for transmitting large amounts of digital data over a wide electromagnetic radiation spectrum of frequency bands with very low power. Ultra wideband radio not only can carry a huge amount of data over a short distance (up to several thousand feet) at very low power densities (a few nanowatts/Hz), but has the ability to carry signals through doors and other obstacles that tend to reflect signals at more limited bandwidths and a higher power.

Ultra wideband radio broadcasts digital pulses that are timed very precisely on a signal across a very wide spectrum (number of frequency bands) at the same time. Transmitter and receiver must be coordinated to send and receive pulses with an accuracy of trillionths of a second. On any given frequency band that may already be in use, the ultra wideband signal has less power than the normal and anticipated background noise so theoretically no interference is possible. There is the potential for a data rate in the billions of bits per second using this technology.

Code Division Multiple Access (CDMA) is a digital spread-spectrum modulation technique that is transmitted over radio waves and used mainly with personal communications devices such as mobile phones. It uses mathematical codes to transmit and distinguish between multiple wireless conversations. CDMA and CDMA-like methods can be used with Ultra wideband radios to increase the number of users that can be supported from one base station.

The technology underlying CDMA is spread-spectrum communication. To understand CDMA transmission, it is necessary to have a general understanding of how wireless technology works. Wireless technology creates a virtual link over the air that mimics a physical wire connection. The principle of spread spectrum communication, a modulation technique that scatters data transmissions across an available frequency band, makes this possible. In spread spectrum communication a wireless unit scans a group of control channels to determine the strongest base station signal. When a telephone call is placed, signal is sent to the base station. The mobile switching center (MSC) dispatches the request to all base stations in the cellular system. The mobile identification number (MIN), which is the subscriber's telephone number, is then broadcast as a paging message to the forward control channels throughout the cellular system. The mobile receives the page, and identifies itself through the reverse control channel. The base station of the mobile informs the MSC of the "handshake", and the MSC instructs the base station to move the call to an unused channel. All of these events happen within a few seconds which are unnoticeable by the users.

Once a call is initiated by the user, CDMA digitizes the conversation and tags it with a special code. The data is then scattered across the frequency band, and the receiving device is instructed to decipher only the data corresponding to a particular code to reconstruct the signal.

Although there are hundreds of channels available, if each channel were assigned to only one cell, total system capacity would equal to the total number of channels, adjusted for the Erlang blocking probability: only a few thousand subscribers per system. By reusing channels in multiple cells the system can grow without geographical limits.

Reuse is critically dependent upon the fact that the electromagnetic field attenuation in the cellular bands tends to be more rapid with distance than it is in free space. Measurements have shown repeatedly that typically the field intensity decays like $R^{-n}$, with $3<n<5$. In free space $n=2$. In fact, it is easily shown that the cellular concept fails completely due to interference that grows without bound if the propagation is exactly free space.

Typical cellular reuse (pre-CDMA) is easily rationalized by considering an idealized system. If we assume that propagation is uniformly $R^{-n}$, and that cell boundaries are at the equisignal points, then a planar service area is optimally covered by the classical hexagonal array of cells where seven sets of channels are used, with one set in each cell. This seven-cell unit is then replicated over the entire service area.

No similar cells are adjacent, and therefore there are no adjacent cells using the same channel. While real systems do not ever look like these idealized hexagonal tilings of a plane, the seven-way reuse is typical of that achieved in practice.

The capacity of a K-way reuse pattern is simply the total number of available channels divided by K. With K=7 and 416 channels, there are approximately 57 channels available per cell. At a typical offered load of 0.05 Erlangs per subscriber, each site supports about 1140 subscribers.

It might be expected that system capacity could be increased by antenna sectorization. Sites are in fact sectorized by the operators, usually three-ways. That is, each site is equipped with three sets of directional antennas, with their azimuths separated by 120°. Unfortunately, for currently used frequency based systems, the sectorization does not in practice lead to an increase in capacity. The reason is that the sector-to-sector isolation, often no more than a few dB, is insufficient to guarantee acceptably low interference. Only in part is this due to the poor front-to-back ratio of the antennas. The vagaries of electromagnetic propagation in the real world also conspire to mix signals between sectors. The practical result of sectorization is only an increase in coverage because of the increased forward gain of the directional antenna. Nothing is gained in reuse. The same seven-way cell reuse pattern applies in sectored cells as in omnidirectional cells. Viewed from the standpoint of sectors, the reuse is K=7*3=21, not 7.

CDMA offers an answer to the capacity problem. The key to its high capacity is the use of noise-like carrier waves, as was first suggested decades ago by Claude Shannon. Instead of partitioning either spectrum or time into disjoint "slots" each user is assigned a different instance of the noise carrier. While those waveforms are not rigorously orthogonal, they are nearly so. Practical application of this principle has always used digitally generated pseudo-noise, rather than true thermal noise. The basic benefits are preserved, and the transmitters and receivers are simplified because large portions can be implemented using high density digital devices.

The major benefit of noise-like carriers is that the system sensitivity to interference is fundamentally altered. Traditional time or frequency slotted systems must be designed with a reuse ratio that satisfies the worst-case interference scenario, but only a small fraction of the users actually experience that worst-case. Use of noise-like carriers, with all users occupying the same spectrum, makes the effective noise the sum of all other-user signals. The receiver correlates its input with the desired noise carrier, enhancing the signal to noise ratio at the detector. The enhancement overcomes the summed noise enough to provide an adequate SNR at the detector. Because the interference is summed, the system is no longer sensitive to worst-case interference, but rather to average interference.

Capacity is determined by the balance between the required SNR for each user, and the spread spectrum processing gain. The figure of merit of a well-designed digital receiver is the dimensionless signal-to-noise ratio (SNR):

$$E_b/N_0 \equiv \frac{\text{Energy per bit}}{\text{Power spectral density of noise} + \text{interference}} \quad (1)$$

The "noise" part of the SNR, in a spread spectrum system is actually the sum of thermal noise and the other-user interference. The SNR needed to achieve a particular error rate depends on several factors, such as the forward error correction coding used, and the multipath and fading environment. For the receivers typically used in commercial CDMA it ranges typically from about 3 dB to 9 dB.

Energy per bit is related to signal power and data rate:

$$E_b = P_s/R \quad (2)$$

The noise+interference term is power spectral density. If the spectrum of the signals is roughly rectangular, with a bandwidth of W, then the noise+interference power spectral density is:

$$N_0 = F_N k_B T_0 + W^{-1} \sum_{otherusers} P_i \quad (3)$$

where the first term represents the thermal noise level of the receiver ($F_N$=receiver noise figure). Rewriting the SNR equation in terms of the data rate and the spread-spectrum bandwidth shows where the magic lies:

$$(E_b/(N_0 + I_0))_j = \frac{P_j/R}{N_0 + W^{-1}\sum_i P_i} \quad (4)$$

The interference in this equation is the sum of the signals from all users other than the one of interest.

Historically, CDMA (and spread spectrum in general) was dismissed as unworkable in the mobile radio environment because of what was called the "near-far problem." It was always assumed that all the stations transmitted constant power. In the mobile radio environment some users may be located near the base station, others may be located far away. The propagation path loss difference between those extreme users can be many tens of dB. Suppose, for example that only two users are present, and that both are transmitting with enough power that the thermal noise is negligible. Then the SNR, in dB, is:

$$(E_b/N_0)_{dB} = \frac{W}{R} + P_j - P_i \quad (5)$$

If there is, say, 30 dB difference between the largest and smallest path losses, then there is a 60 dB difference between the SNR of the closest user and the farthest user, because these are the received powers. To accommodate the farthest users, the spreading bandwidth would have to be perhaps 40 dB, or 10,000 times the data rate. If the data rate were 10,000 b/s, then W=100 MHz. The spectral efficiency is abysmal, far worse than even the most inefficient FDMA or TDMA system. Conversely, if a more reasonable bandwidth is chosen, then remote users receive no service.

This observation was, for years, the rationale for not even attempting any sort of spread spectrum in any but geosynchronous satellite environments, where the path loss spread was relatively small.

The key to the high capacity of commercial CDMA is extremely simple: power control. If, rather than using constant power, the transmitters can be controlled in such a way that the received powers from all users are roughly equal, then the benefits of spreading are realized. If the received power is controlled, then the subscribers can occupy the same spectrum, and the hoped-for benefits of interference averaging accrue.

Assuming perfect power control, the noise plus interference is now:

$$N_0 + I_0 = N_0 + (N-1)P_s \qquad (6)$$

$$N_0 = F_N k_B T_0$$

where N is the total number of users. The SNR becomes:

$$N - 1 = \frac{W/R}{(E_b/(N_0+I_0))_{target}} - \frac{N_0}{P_s} \xrightarrow[P_s \to \infty]{} \frac{W/R}{(E_b/(N_0+I_0))_{target}} \qquad (7)$$

Maximum capacity is achieved if we adjust the power control so that the SNR is exactly what it needs to be for an acceptable error rate. If we set the left hand side of the above equation to that target SNR and solve for N, we find the basic capacity equation for CDMA:

$$E_b/(N_0+I_0) = \frac{P_s/R}{N_0 + (N-1)P_s/W} = \frac{W/R}{(N_0 W/P_s) + N - 1} \qquad (8)$$

Using the numbers for IS-95A CDMA with the 9.6 kbps rate set, we find:

$$N \approx (W/R)_{dB} - (E_b/(N_0+I_0))_{target, dB} \approx 21.1 - 6 \text{ dB} = 15.1 \text{ dB} \qquad (9)$$

or about N=32. The target SNR of 6 dB is a nominal estimate. Once power control is available, the system designer and operator have the freedom to trade quality of service for capacity by adjusting the SNR target. Note that capacity and SNR are reciprocal: a three dB improvement in SNR incurs a factor of two loss in capacity, and vice-versa.

We've neglected the difference between N and N−1 in equation (9). This is convenient in the capacity math, and is usually reasonable because the capacity is so large.

The sustainable capacity is proportional to the processing gain, reduced by the required SNR. While there are several considerations we have yet to look at, there is already a suggestion of the capacity enhancement possible. With $E_b/N_0$ in the 3–9 dB range, equation (9)gives a capacity in the neighborhood of 16–64 users. In the same bandwidth, a single sector of a single AMPS cell has only 2 channels available.

The discussion leading to equation (9) above equation assumes only a single cell, with no interference from neighboring cells. One might ask what has been gained here. The capacity of an isolated AMPS cell likewise is very high. In fact, there is nothing to stop you from using all the channels if there are no neighbors; reuse is not needed. The capacity of that fully populated AMPS cell would be about 42 channels (1.25 MHz/30 kHz channel spacing). This is not greatly different than the number that we just calculated for CDMA.

To find what happens with the neighbor cell interference, we have to add that interference into equation (3) above. The math of this can be found in several of the references. It turns out that the fraction of the reverse link interference that comes from the neighbor cell is about 60% of the own-cell interference. And, importantly, this answer is not terribly sensitive to the parameters of the model, provided we assume that the mobiles are power-controlled in a sensible way.

System capacity, as you might expect, is affected by propagation phenomena. Users of analog cellular phones are familiar with the fading that is so annoying, $$F \equiv \frac{\text{Total interference power}}{\text{Own-cell interference power}} \qquad (10)$$

especially in handheld portables when standing nearly still. Fading in a moving vehicle is more rapid, being caused by motion of the vehicle through stationary interference patterns, where the spatial scale of the interference pattern is the wavelength, about one foot. CDMA is much more robust than the analog technologies in the presence of multipath, but it does affect capacity.

There are two questions that one must address regarding multipath fading and CDMA. First, under what circumstances will CDMA experience fading, and second, what is the effect of fading, when it occurs, on the CDMA channel.

When the multipath components are "resolved" by the CDMA waveform, that is, when their delays are separated by at least the decorrelation time of the spreading, then they can be separated by the despreading correlator in the receiver. They do not interfere because each component correlates at a different delay. When the multipath components are separated by less than the decorrelation time, then they cannot be separated in the receiver, and they do interfere with one another, leading to what is sometimes called flat fading.

Fading is also characterized as Rayleigh or Rician. Rayleigh fading is the result of a vector sum of multiple signal components, each having a random amplitude. It can be viewed alternatively as a signal whose I and Q amplitudes are Gaussian random deviates. Rayleigh fading exhibits deep signal dropouts.

If there is a strong, constant component to the signal, in addition to the multiple random components of Rayleigh fading, then the fading is said to be Ricean. Ricean fading is typical of line-of-sight situations, where there is a direct, unobstructed path between stations, as well as reflecting or scattering surfaces. Multipath differences less than the duration of one spreading chip will lead to flat fading; greater will lead to resolved multipath, which will be diversity combined by the receiver.

To address the second question, that of the effects of fading, the answer is complex and is different in the forward and reverse links. It also depends on the fading rate, which in turn depends on the velocity of the mobile station. Generally fading increases the average SNR needed for a particular error rate. The increase can be as much as perhaps 6 dB. In the reverse link, the power control will mitigate the effects of fading at low speed; at high speed it has little effect. At high speed, and in both links, the FEC coding and interleaving becomes more effective as the characteristic fade time becomes less than the interleaver span.

Spread spectrum multiple access transmits the entire signal over a bandwidth that is much greater than that required for standard narrow band transmissions in order to gain signal-to-noise (S/N) performance. In channels with narrowband noise, increasing the transmitted signal bandwidth results in an increased probability that the received information will be correct.

From a system viewpoint, the performance increase for very wideband systems is referred to as "process gain". This term is used to describe the received signal fidelity gained at the cost of bandwidth. Errors introduced by a noisy channel can be reduced to any desired level without sacrificing the rate of information transfer using Claude Shannon's equation describing channel capacity:

$$C = W\log2(1+S/N)$$

where C=Channel capacity in bits per second, W=Bandwidth, S/N=Energy per bit/Noise power.

The benefits of increasing bandwidth become more clear. The S/N ratio may be decreased without decreasing the bit error rate. This means that the signal may be spread over a large bandwidth with smaller spectral power levels and still achieve the required data rate. If the total signal power is interpreted as the area under the spectral density curve, then signals with equivalent total power may have either a large signal power concentrated in a small bandwidth or a small signal power spread over a large bandwidth.

A CDMA spread spectrum signal is created by modulating the radio signal with a spreading sequence (a code consisting of a series of binary pulses) known as a pseudo-noise (PN) digital signal because they make the signal appear wide band and "noise like". The PN code runs at a higher rate than the RF signal and determines the actual transmission bandwidth. Messages can also be cryptographically encoded to any level of secrecy desired with direct sequencing as the entire transmitted/received message is purely digital.

An SS receiver uses a locally generated replica pseudo noise code and a receiver correlator to separate only the desired coded information from all possible signals. A SS correlator can be thought of as a specially matched filter—it responds only to signals that are encoded with a pseudo noise code that matches its own code. Thus an SS correlator (SS signal demodulator) can be "tuned" to different codes simply by changing its local code. This correlator does not respond to man made, natural or artificial noise or interference. It responds only to SS signals with identical matched signal characteristics and encoded with the identical pseudo noise code.

Many spread spectrum radios can share the same frequency band, provided that each system uses a unique spreading code to reduce interference between the different radios. Because only the receiver with the identical code can despread the signal to recover the signal, SS radios can tolerate a high level of interference unlike conventional radios. SSMA is not very bandwidth efficient when used by a single user. However, since many users can share the same spread spectrum bandwidth without interfering with one another, SS systems become bandwidth efficient in multiple user environments. This reason makes SS communication an ideal choice for metropolitan areas with large blocking rates.

The spread of energy over a wide band, or lower spectral power density, makes SS signals less likely to interfere with narrow band communications, because the spreaded signal power is near that of Gaussian noise levels. Narrow band communications, conversely, cause little to no interference to SS systems because the correlation receiver effectively integrates over a very wide bandwidth to recover an SS signal. The correlator then "spreads" out a narrow band interferer over the receiver's total detection bandwidth.

CDMA technology focuses primarily on the "direct sequence" method of spread spectrum. Direct sequence is spread spectrum technique in which the bandwidth of a signal is increased by artificially increasing the bit data rate. This is done by breaking each bit into a number of sub-bits called "chips". Assuming this number is 10, each bit of the original signal would be divided up into 10 separate bits, or "chips." This results in an increase in the data rate by 10. By increasing the data rate by 10, we also increase the bandwidth by 10.

The signal is divided up into smaller bits by multiplying it by a Pseudo-Noise code, PN-code. A PN-code is a sequence of high data rate bits ("chips") ranging from −1 to 1 (polar) or 0 to 1 (non-polar). When referring to the number of "chips" used, we mean the number of small data bits in the PN-code per single bit of the original signal. Simply by multiplying the original modulated signal by this high data rate PN-code will result in dividing the signal into smaller bits, and hence, increase its bandwidth. This process is shown in the figure below.

The greater number of "chips" used results in a wider bandwidth proportional to the number of "chips".

The basic operation of the transmitter and receiver for spread spectrum will now be described briefly. Let's assume there are two transmitters with two different messages to be transmitted. We should keep in mind that each transmitter can be thought of as separate cell phones. Each signal is multiplied by its own unique Pseudo-Noise code, C1(t) and C2(t). These are the high data rate bit patterns which spreads the signal's bandwidth. For this example, we will assume the range values for the PN-code is −1 and 1. After spreading the bandwidth, each signal is transmitted. Because many signals can be transmitted from different transmitters at the same time, we represent these transmissions by simply summing their spectrums.

At the receiver end, the incoming signal is the spread spectrum signal. In order for a receiver to extract a single message, it must multiply the incoming signal by the correct PN-code. Because we chose the PN-code to range from −1 to 1, this technique of multiplying by the PN-code works perfectly. Since the original signal at the transmitter end was multiplied by the PN-code, and again multiplied by the same PN-code at the receiver end, we effectively canceled out the PN-code for that particular message. The figure below helps illustrate how the PN-code is eliminated.

By eliminating the PN-code, we eliminate the spread spectrum effects for that particular message signal. The receiver circuit that does this is called a correlator, and it collapses the spread signal back down to just the original data stream. This operation selects only the desired signal while rejecting all surrounding frequencies due to other messages in the spread spectrum. This rejection is known as the processing gain of the despreading correlation process.

Processing gain is a direct consequence of the direct sequence radio signal spreading and despreading process. It refers to the increase in signal-to-noise ratio that results from this process, and is required for successful data communications. Processing gain increases as the number of chips per data bit increases, and this can be manipulated by the system designer to get the desired effect.

Frequency Division Multiple Access (FDMA), Time Division Multiple Access (TDMA) and Code Division Multiple Access (CDMA) are the three basic multiple access schemes. FDMA divides radio channels into a range of radio frequencies and is used in the traditional analog cellular system. With FDMA, only one subscriber is assigned to a channel at a time. Other conversations can access this channel only after the subscriber's call has terminated or after the original call is handed off to a different channel by the system. FDMA cellular standards include AMPS (Advanced Mobile Phone Service) and TACS (Total Access Communications System).

TDMA is a common multiple access technique employed in digital cellular systems. It divides conventional radio channels into time slots to obtain higher capacity. Its standards include North American Digital Cellular, Global System for GSM (Mobile Communications), and PDC (Personal Digital Cellular). As with FDMA, no other conversations can access an occupied TDMA channel until the channel is vacated.

CDMA uses a radically deferent approach. It assigns each subscriber a unique "code" to put multiple users on the same wideband channel at the same time. The codes, called "pseudo-random code sequences", are used by both the mobile station and the base station to distinguish between conversations. The IS-95 CDMA standard was adopted by the TIA (Telecommunications Industry Association) and became a digital cellular standard in 1992. The J-STD-008 standard for personal communications services was also accepted by ANSI. CDMA is the first digital technology which meets the exacting standards of the CTIA (Cellular Telecommunications Industry Association). Depending on the level of mobility of the system, it provides 10 to 20 times the capacity of AMPS, and 4 to 7 times the capacity of TDMA. CDMA is the only one of the three technologies that can efficiently utilize spectrum allocation and offer service to many subscribers without requiring extensive frequency planning. All CDMA users can share the same frequency band because their conversations are distinguished only by digital code, while TDMA operators have to coordinate the allocation of channels in each cell in order to avoid interfering with adjacent channels. The average transmitted power required by CDMA is much lower than what is required by analog, FDMA and TDMA technologies.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

The invention claimed is:

1. A method for managing the channel suitability in a multiple access scheme, comprising:
   obtaining information relating to noise associated with a channel;
   estimating a potential effect of the noise on a transmission quality of the channel based on the obtained information;
   assigning a rating to the channel based on the estimated potential effect;
   classifying the channel into a grade of service class based on the assigned rating, the grade of service class comprising an alphanumeric grade, a video grade, an audio grade, and a not suitable grade; and
   storing information relating to the channel and the associated rating and grade in a database.

2. The method of claim 1, wherein obtaining information relating to noise associated with a channel further comprises: sampling channel noise; and correlating the sampled channel noise with the channel.

3. The method of claim 1, wherein estimating a potential effect of the noise on the transmission quality of the channel based on the obtained information further comprises determining a projected bit error rate for the channel based on the obtained information.

4. The method of claim 3, wherein determining the projected bit error rate for the channel further comprises: calculating one or more interference metrics for the channel using the obtained information; and utilizing the calculated interference metrics to determine the projected bit error rate.

5. The method of claim 4, wherein the interface metrics include a pulse position modulation error rate.

6. The method of claim 1, wherein the grade of service class relates to the channel's suitability for carrying a particular data type.

7. The method of claim 1, further comprising: prioritizing the channel the grade of service class based on the rating of the channel.

8. The method of claim 7, wherein information relating to the priority of the channel is stored in the database.

9. The method of claim 1, wherein the channel is obtained from the database.

10. The method of claim 1, wherein the channel is periodically tested to determine whether the grade of service class of the channel needs to be changed.

11. The method of claim 1, further comprising: receiving a request for a channel from a requestor; searching the database to obtain a channel suitable for fulfilling the request; allocating the suitable channel to the requestor, notifying the requestor to use the allocated channel, and indicating in the database that the allocated channel is in use.

12. The method of claim 1, further comprising: receiving information relating to use of a channel when a user relinquishes use of the channel; determining an actual bit error rate for the relinquished channel based on the received information, assigning a rating to the relinquished channel based on the actual bit error rate; classifying the channel to a grade of service class based on the assigned rating; updating the information relating to the channel stored in the database to indicate grade of service class of the channel based on the actual bit error rate and that the channel is available for use.

13. The method of claim 1, wherein the channel comprises a sequence code in a code-division multiple access (CDMA) scheme.

14. The method of claim 1, wherein the channel comprises an ultra wideband radio channel.

15. A system for managing the channel suitability in a multiple access scheme, comprising:
   logic for obtaining information relating to noise associated with a channel;
   logic for estimating a potential effect of the noise on a transmission quality of the channel based on the obtained information;
   logic for assigning a rating to the channel based on the estimated potential effect;
   logic for classifying the channel into a grade of service class based on the assigned rating, the grade of service class comprising an alphanumeric grade, a video grade, an audio grade, and a not suitable grade; and
   logic for storing information relating to the channel and the associated rating and grade in a database.

16. The system of claim 15, wherein the logic for obtaining information relating to noise associated with a channel further comprises logic for sampling channel noise; and logic for correlating the sampled channel noise with the channel.

17. The system of claim 15, wherein the logic for estimating a potential effect of the noise on the transmission quality of the channel based on the obtained information further comprises logic for determining a projected bit error rate for the channel based on the obtained information.

18. The system of claim 17, wherein the logic for determining the projected bit error rate for the channel further comprises logic for calculating one or more interference metrics for the channel using the obtained information; and logic for utilizing the calculated interference metrics to determine the projected bit error rate.

19. The system of claim 18, wherein the interface metrics include a pulse position modulation error rate.

20. The system of claim 15, wherein the grade of service class relates to the channel's suitability for carrying a particular data type.

21. The system of claim 15, further comprising logic for prioritizing the channel the grade of service class based on the rating of the channel.

22. The system of claim 21, wherein information relating to the priority of the channel is stored in the database.

23. The system of claim 15, wherein the channel is obtained from the database.

24. The system of claim 15, wherein the channel is periodically tested to determine whether the grade of service class of the channel needs to be changed.

25. The system of claim 15, further comprising logic for receiving a request for a channel from a requestor; logic for searching the database to obtain a channel suitable for fulfilling the request; logic for allocating the suitable channel to the requestor, logic for notifying the requestor to use the allocated channel, and logic for indicating in the database that the allocated channel is in use.

26. The system of claim 15, further comprising logic for receiving information relating to use of a channel when a user relinquishes use of the channel; logic for determining an actual bit error rate for the relinquished channel based on the received information, logic for assigning a rating to the relinquished channel based on the actual bit error rate; logic for classifying the channel to a grade of service class based on the assigned rating; logic for updating the information relating to the channel stored in the database to indicate grade of service class of the channel based on the actual bit error rate and that the channel is available for use.

27. The system of claim 15, wherein the channel comprises a sequence code in a code-division multiple access (CDMA) scheme.

28. The system of claim 15, wherein the channel comprises an ultra wideband radio channel.

29. A computer program product for managing the channel suitability in a multiple access scheme, comprising:
   computer code for obtaining information relating to noise associated with a channel;
   computer code for estimating a potential effect of the noise on a transmission quality of the channel based on the obtained information;
   computer code for assigning a rating to the channel based on the estimated potential effect;
   computer code for classifying the channel into a grade of service class based on the assigned rating, the grade of service class comprising an alphanumeric grade, a video grade, an audio grade, and a not suitable grade; and
   computer code for storing information relating to the channel and the associated rating and grade in a database.

30. The computer program product of claim 29, wherein the computer code for obtaining information relating to noise associated with a channel further comprises computer code for sampling channel noise; and computer code for correlating the sampled channel noise with the channel.

31. The computer program product of claim 29, wherein the computer code for estimating a potential effect of the noise on the transmission quality of the channel based on the obtained information further comprises computer code for determining a projected bit error rate for the channel based on the obtained information.

32. The computer program product of claim 31, wherein the computer code for determining the projected bit error rate for the channel further comprises computer code for calculating one or more interference metrics for the channel using the obtained information; and computer code for utilizing the calculated interference metrics to determine the projected bit error rate.

33. The computer program product of claim 32, wherein the interface metrics include a pulse position modulation error rate.

34. The computer program product of claim 29, wherein the grade of service class relates to the channel's suitability for carrying a particular data type.

35. The computer program product of claim 29, further comprising computer code for prioritizing the channel the grade of service class based on the rating of the channel.

36. The computer program product of claim 35, wherein information relating to the priority of the channel is stored in the database.

37. The computer program product of claim 29, wherein the channel is obtained from the database.

38. The computer program product of claim 29, wherein the channel is periodically tested to determine whether the grade of service class of the channel needs to be changed.

39. The computer program product of claim 29, further comprising computer code for receiving a request for a channel from a requestor; computer code for searching the database to obtain a channel suitable for fulfilling the request; computer code for allocating the suitable channel to the requestor, computer code for notifying the requestor to use the allocated channel, and computer code for indicating in the database that the allocated channel is in use.

40. The computer program product of claim 29, further comprising computer code for receiving information relating to use of a channel when a user relinquishes use of the channel; computer code for determining an actual bit error rate for the relinquished channel based on the received information, computer code for assigning a rating to the relinquished channel based on the actual bit error rate; computer code for classifying the channel to a grade of service class based on the assigned rating; computer code for updating the information relating to the channel stored in the database to indicate grade of service class of the channel based on the actual bit error rate and that the channel is available for use.

41. The computer program product of claim 29, wherein the channel comprises a sequence code in a code-division multiple access (CDMA) scheme.

42. The computer program product of claim 29, wherein the channel comprises an ultra wideband radio channel.

43. A method for managing a wireless channel suitability in a wireless multiple access scheme, comprising:
   obtaining information relating to noise associated with a wireless channel;
   estimating a potential effect of the noise on a transmission quality of the wireless channel based on the obtained information;
   assigning a rating to the wireless channel based on the estimated potential effect;
   classifying the wireless channel into a grade of service class based on the assigned rating, the grade of service class comprising an alphanumeric grade, a video grade, an audio grade, and a not suitable grade; and storing information relating to the wireless channel and the associated rating and grade in a database.

44. A method for managing an ultra-wideband channel suitability in a multiple access scheme, comprising:

obtaining information relating to noise associated with an ultra-wideband channel;

estimating a potential effect of the noise on a transmission quality of the ultra-wideband channel based on the obtained information;

assigning a rating to the ultra-wideband channel based on the estimated potential effect;

classifying the wireless channel into a grade of service class based on the assigned rating, the grade of service class comprising an alphanumeric grade, a video grade, an audio grade, and a not suitable grade; and storing information relating to the ultra-wideband channel and the associated rating and grade in a database.

* * * * *